March 13, 1962     G. A. LYON     3,025,110
WHEEL COVER
Filed March 10, 1959     2 Sheets-Sheet 1
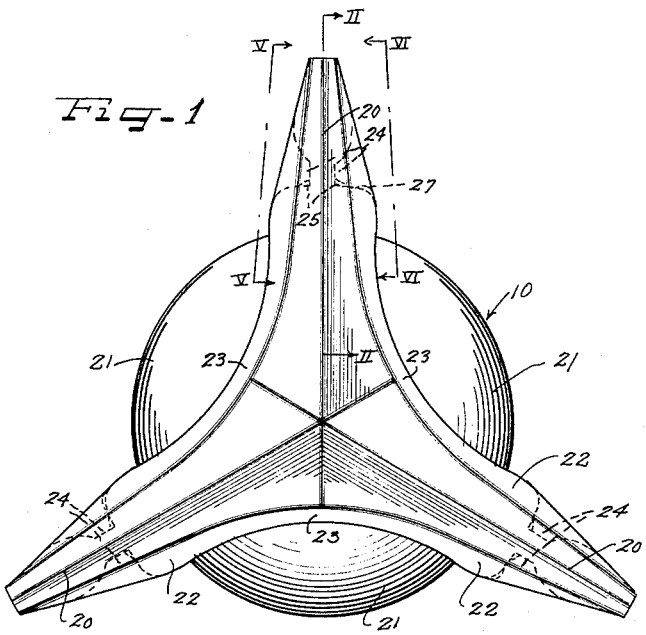
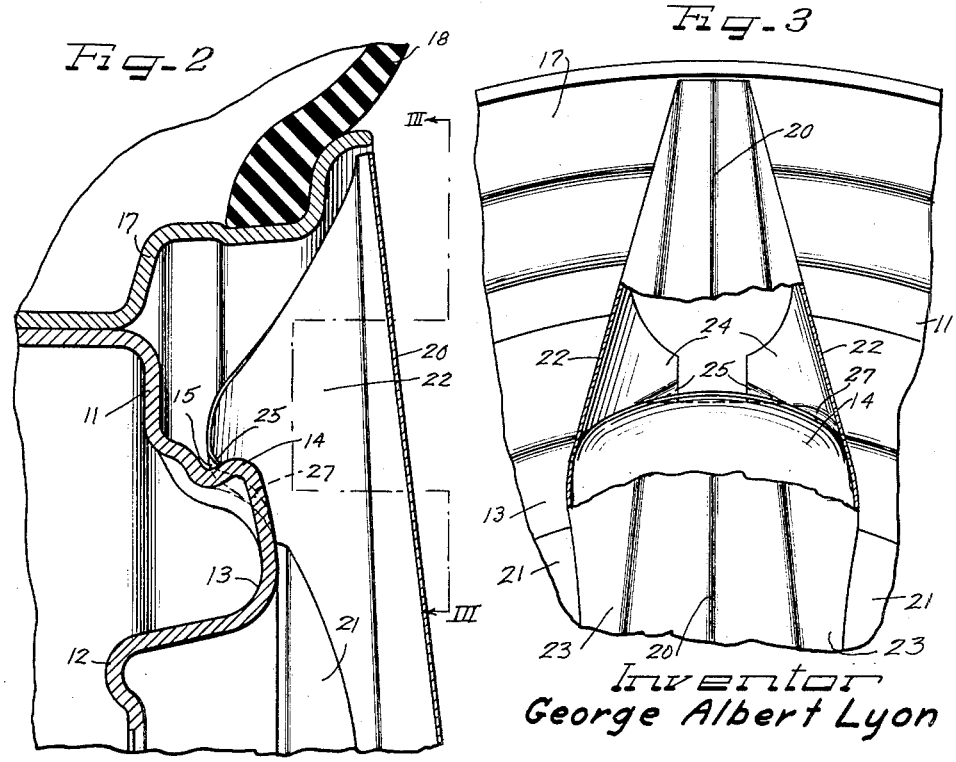
Inventor
George Albert Lyon March 13, 1962

G. A. LYON 3,025,110

WHEEL COVER

Filed March 10, 1959

Inventor
George Albert Lyon
by Hill, Sherman, Meroni, Gross & Simpson Attys.

United States Patent Office 3,025,110
Patented Mar. 13, 1962

3,025,110
WHEEL COVER
George Albert Lyon, Detroit, Mich., assignor to Lyon Incorporated, Detroit, Mich., a corporation of Delaware
Filed Mar. 10, 1959, Ser. No. 798,368
12 Claims. (Cl. 301—37)

The present invention relates to improvements in wheel structures and more particularly concerns the ornamental and protective covering of the outer sides of vehicle wheels.

An important object of the present invention is to provide an economical hub cap type wheel cover constructed and arranged for protectively covering the hub portion of a vehicle wheel and provided with novel combination ornamental and cover retaining means.

Another object of the invention is to provide an improved wheel structure including a wheel cover member constructed and arranged to be retainingly engaged with retaining projections on the wheel by a rotary attachment movement of the cover member relative to the wheel.

A further object of the invention is to provide a wheel structure including a wheel part having circumferentially spaced cover retaining bumps and a cover member for disposition over the outer side of the wheel and having retaining means registerable in concealed relation behind the cover with the bumps, registration being facilitated by rotation of the cover to effect snapping of the retaining means into engagement with the bumps.

Still another object of the invention is to provide a hub cap type wheel cover provided with a central wheel hub covering cap portion provided with radially projecting hollow ears equipped with novel means for snap-on and off retaining interengagement with retaining bumps on a wheel.

A yet further object of the invention is to provide a novel hub cap type wheel cover with integral one-piece shell construction cap body and ornamental projecting ears, with integral cover retaining flanges on the ears retainingly engageable with retaining bumps on a wheel body.

It is also an object of the invention to provide a new and improved unitary one-piece sheet metal shell hub cap with spoke arms and means for retaining the cover on a wheel.

Other objects, features and advantages of the present invention will be readily apparent from the following detailed description of a preferred embodiment thereof taken in conjunction with the accompanying drawings, in which:

FIGURE 1 is a top plan view of a spoke arm hub cap cover member embodying features of the present invention;

FIGURE 2 is an enlarged fragmentary radial sectional detail view through one of the spoke arms of the cover member, taken substantially along the line II—II of FIGURE 1, and showing the cover member as it is in position on a vehicle wheel;

FIGURE 3 is a sectional elevational detail view taken substantially on the line III—III of FIGURE 2;

Figure 4:
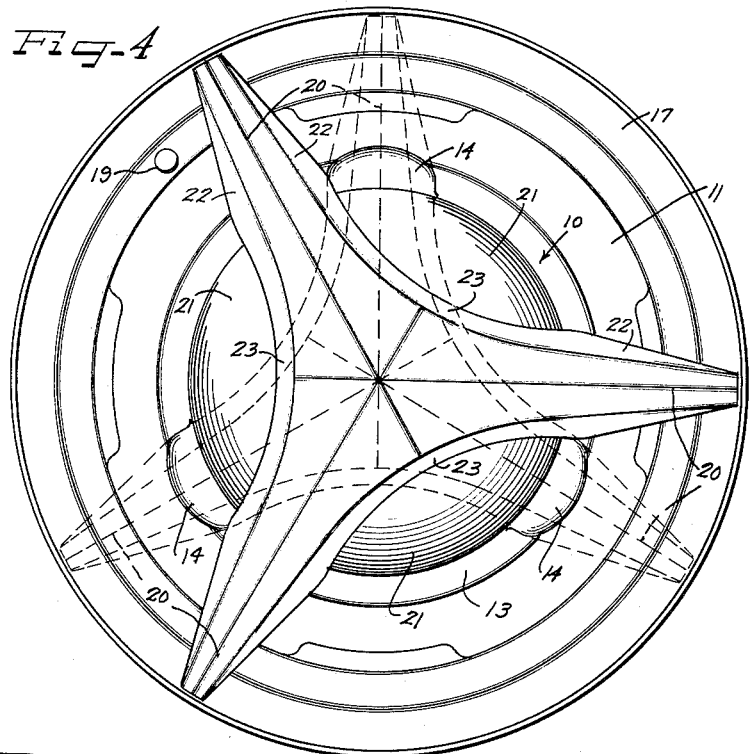
FIGURE 4 is an outer side elevational view of the vehicle wheel and illustrating the spoke arm hub cap cover member disposed in position on the wheel preparatory to being turned relative thereto into the dash outline position wherein the cover retaining means carried by the spoke arms have been snapped into engagement with the retaining protrusions or bumps on the wheel body.

A hub cap cover member 10 in the form of a hollow sheet metal shell (FIGS. 1 and 2) is constructed and arranged to be applied over the outer side of a vehicle wheel including a wheel body 11 having a central inset bolt-on flange 12 about which is an annular generally axially outwardly projecting nose bulge 13 having at circumferentially spaced intervals such as three, respective generally radially outwardly projecting cover retaining protrusions or bumps 14 each of which has an axially inwardly and radially outwardly facing wheel body overhanging retaining shoulder 15 and generally rounded sides. Carried by the wheel body is a multi-flange, drop center tire rim 17 adapted to support in the usual way a pneumatic tire 18 which may be of the tubeless type as shown. A valve stem (not shown) is adapted to be mounted in communication with a valve stem aperture 19 in the tire rim (FIG. 4).

According to the present invention, the cap member 10 comprises a generally domed sheet metal shell which may be made from stainless steel or other suitable sheet or strip stock and of a basic diameter to overlie the bolt-on flange and the nose bulge 13 of the wheel body and providing therewith an enclosure for a hub of an axle structure projecting through the usual central aperture in the bolt-on flange of the wheel. However, the basic cap is configurated to provide a generally three-armed star shaped crown formation providing radially projecting equidistantly spaced spoke arms 20 emanating from the center of the crown of the cap and projecting radially outwardly beyond the basic diameter of the cap to overlie the tire rim 17. Actually, the cap member 10 comprises a plurality of segmental dome panel connecting portions 21 joining integrally in one-piece respective opposite side walls 22 of the axially inwardly hollow spoke arms 20.

Herein the side walls 22 diverge relative to one another in a circumferential direction and generally converge toward the tips of the spoke arms. In addition, the side walls 22 of the spoke arms are respectively connected together by arcuate junctures providing angular reinforcing flanges 23 joining the inner boundaries of the segmental crown cap panels 21 between the spoke arms.

Figures 5, 6:
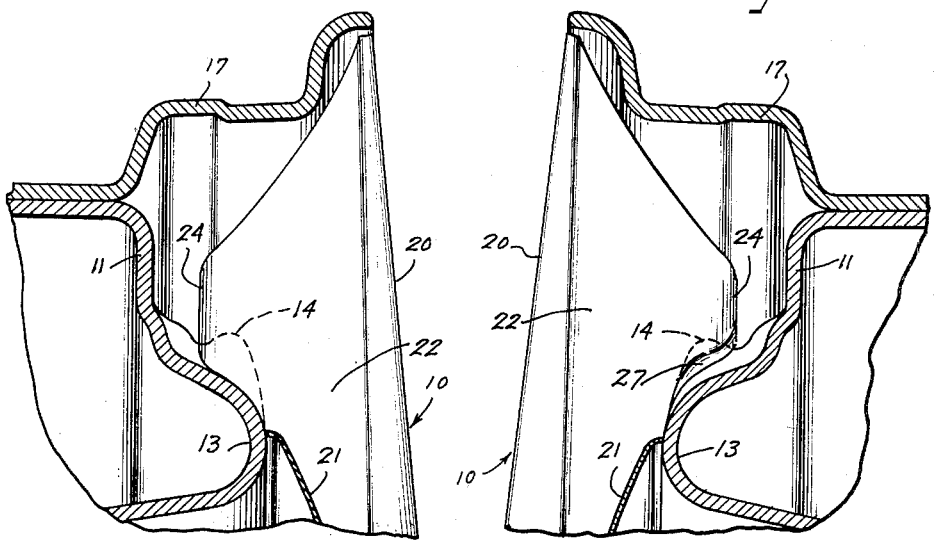
FIGURE 5 is an enlarged fragmentary radial sectional detail view taken substantially on the line V—V of FIGURE 1, and similarly as in FIGURE 2 showing the cover member on the wheel.
FIGURE 6 is an enlarged radial sectional elevational detail view taken substantially on the line VI—VI of FIGURE 1 and also showing the cover member on the wheel.

Adjacent to and radially outwardly beyond the outer edges defining the intervening cap panel segments 21, the arm side walls 22 are substantially wider than in the relatively narrow connecting flange portions 23, with the portions of the side walls freely beyond the cap segments 21, extending axially inwardly substantially beyond the segment outer edges, as best seen in FIGURES 2, 5 and 6. This affords a cap structure within the circumference of the cap segments 21 of substantial stiffness even though the material from which the cover unit 10 is made possesses substantial inherent resiliency in the drawn form. The degree of rigidity or stiffening can be predetermined within some limits by the width of the connecting flange portions 23, the degree of angularity thereof to the cap segments 21 and the degree of angularity of the crown portions of the arms 20 to the connecting flange portions 23, such crown portions being shown in one preferred form as comprising respective pairs of diverging relatively flat panels joined respectively angularly at the center of the cap. In addition to providing an attractive faceted appearance, this structure affords substantial rigidity not only throughout the length of the arms 20 but also in the crown portion of the cap.

By reason of being relatively free beyond the edges of the cap segments 21, the wider portions of the side walls 22 of the arms are resiliently flexible across their planes, that is generally circumferentially relative to the cap unit. This is utilized in providing the cap unit 10 with cover retaining means for snap-on and -off interengagement with the cover retaining protrusions 14 on the wheel body. For this purpose, each of the spoke arms has a pair of cover-retaining fingers, herein provided by each of the arm side walls 22 in the widest portion thereof having an underturned retaining lug flange finger 24. Each of the fingers is preferably of a curved cold worked form transversely relative to the arm side wall 22 of which it is an integral one-piece part and tapers from a terminal end in each direction radially so as to be progressively resiliently stiffer from the terminal end toward merger with the respective side wall 22. It will be observed in FIGURE 3, that the terminal ends of the fingers 24 of each pair of fingers are directed generally circumferentially toward but in spaced relation to one another. The retaining fingers 24 are thus completely concealed behind or at the axially inner sides of the respective arms 20.

Each of the retaining fingers 24 is provided with a radially inner edge for retaining engagement with the shoulder 15 of one of the retaining bumps 14. To assure effective tensioned retaining grip of the bump shoulders 15, the retaining edges of the fingers 24 are disposed on a diameter which is sufficiently slightly at variance with the diameter described about the retaining shoulders 15 to assure that when the retaining edges are all in retaining engagement with the bump shoulders all of the retaining fingers 24 will be under slight radially outward deflection and thus under resilient tension thrusting the retaining edges effectively against the retaining shoulders of the bumps. Further assurance of effective retaining engagement with the shoulders 15 is afforded by having the bump engaging edge portions of the fingers turned slightly axially outwardly as at 25 but projecting generally radially inwardly to engage substantially normally against the oblique overhanging bump shoulders 15. Moreover, by having the retaining edges of the fingers 24 tapering generally in radially inward direction, the fingers oppose coactively the circumferential side portions of the bumps 14 as best seen in FIGS. 5 and 6 and thus retain the cap unit against turning on the wheel so that the retaining fingers remain properly oriented relative to the retaining bumps to hold the cap unit on the wheel against axially outward displacement.

Although application of the cap member 10 may be effected by aligning the spoke arms 20 over the retaining bumps 14 and then pressing axially inwardly to snap all or certain of the retaining fingers 24 into retaining engagement with the retaining bumps 14, the present construction is well adapted for turning the cap into the retaining engagement substantially as depicted in FIG. 4. For this purpose the spoke arms 20 serve as convenient handles, and means are provided for implementing such turning attachment of the cover member. Since most generally members to be interengaged by turning movement are rotated toward the right or clockwise the implementing or facilitating means in preferred form comprises construction of the retaining finger flange portions on the right-hand sidewalls 22 of the spoke arms, as by providing the radially inner side portions of the right-hand finger flanges 24 with camming-in means in the form of inturned camming shoulders 27. Assuming the cap cover member 10 to be in the full line position shown in FIG. 4 with the edges of the cap segments 21 engaging the crest of the nose bulge 13 of the wheel body and with the radially inner edges of the left side retaining finger flanges 24 engaging the radially outer side of the nose bulge to thus center the cover cap, clockwise turning of the cap member causes the camming shoulders 27 to ride onto the opposing left side portions of the retaining protrusions 14. By resilient yielding of the right side retaining fingers, continued torque in clockwise direction causes these fingers as guided by the camming shoulders 27 to ride along and past the nose projections of the protrusion bumps 14 until the camming shoulders 27 snap into opposing relation to the opposite or right sides of the associated retaining bumps and the retaining terminal edge portions 25 of the fingers assume the cover retaining gripping engagement with the bump shoulders 15. In this assembled relationship, the radially inner portions of the fingers 24 adjacent juncture with the sidewalls 22 oppose the sides of the retaining bumps to hold the cover against torsional displacement. In fact, the bump side opposing portion of the left-hand finger 24 in each instance serves as a stop, preventing overrunning during turning of the cover into retained position and snapping of the right-hand fingers over and past the bumps. After the cap cover member 10 is fully in position on the wheel, not only the left-hand finger 24 but also the right-hand finger 24 coacts with the adjacent side of the associated bump to hold the cover against turning out of the retaining interengagement of the fingers with the retaining bumps 14. By the arrangement described a relatively easy-on retained assembly of the cap cover member is adapted to be effected.

Removal of the cap cover member 10 from the wheel may be accomplished by reversing the turning movement of the cap cover member relative to the wheel, that is, by turning the cap cover member in a counterclockwise direction. This may be done by using the spoke arms 20 as lever arms for the purpose. Such turn-off is also facilitated by the turned cam edge 27 in each instance, although by the preferred construction turn-off is subject to somewhat greater resistance than the turn-on operation, thus providing what may be termed generally an easy-on, hard-off relationship. The relatively rigid broad crown structure of the spoke arms 20 and their rigid interconnection, and the stiffness afforded by the intermediate connecting flanges 23 of the spoke sidewalls with respect to each other and to the cap segments 21 assures adequate resistance to damaging deformation during application and removal of the cap cover member with respect to the wheel.

Of course, if preferred, the retaining engagement of the retaining finger flanges 24 of the spoke arms may be released with respect to the retaining bumps 14 by means of a pry-off tool. However, in using a pry-off tool care must be exercised both as to the point of application of pry-off force and the exertion of such force to avoid damage at the point of pry-off force application.

As will be observed from FIGS. 2, 4, 5 and 6, the tips of the spoke arms 20 preferably extend in protected relation within the circumference of the tip of the terminal flange of the tire rim. Furthermore, the edges of the arm sidewalls 22 preferably converge toward the tips of the spoke arms in clearance relation to the tire rim, with axial disposition of the cap cover member 10 being determined by the edges of the cap segments 21. This accommodates the usual tolerance in axial relative disposition of the wheel body 11 and the tire rim 17 and avoids interference with most efficient retaining gripping tensioned coaction of the retaining finger flanges 24 with the retaining bumps 14. This coaction of the retaining fingers with the retaining bumps also assures that the cap member is drawn tightly axially inwardly against the wheel body nose bulge 13, which affords a mutual coaction in maintaining the retaining fingers under resilient gripping tension with the retaining bump shoulders 15.

It will be understood that modifications and variations may be effected without departing from the scope of the novel concepts of the present invention.

I claim as my invention:

1. In a wheel structure including a tire rim and a supporting disk spider wheel body having an annular intermediate axially outwardly projecting nose bulge provided at circumferentially spaced intervals with generally radially outwardly projecting retaining bump protrusions with radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and resiliently flexible finger flanges concealingly carried by said spoke arms and having portions thereof projecting generally radially inwardly and axially outwardly and engageable under resiliently flexible tension retainingly with said bump shoulders and thereby retaining the hub cap member in place on the wheel and drawn axially inwardly tightly against the wheel.

2. In a wheel structure including a tire rim and a supporting disk spider wheel body having an annular intermediate axially outwardly projecting nose bulge provided at circumferentially spaced intervals with generally radially outwardly projecting retaining bump protrusions with radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and resiliently flexible retaining fingers concealingly carried by said spoke arms and engageable under resiliently flexible tension retainingly with said bump shoulders and thereby retaining the hub cap member in place on the wheel and drawn axially inwardly tightly against the wheel, said retaining fingers comprising underturned finger flanges from side walls defining said spoke arms and each of the finger flanges having a generally circumferentially projecting terminal end from which radially inner and radially outer sides of the fingers taper toward juncture with the associated arm sidewall and with portions of the radially inner sides of the fingers providing retaining edges which project generally radially inwardly and axially outwardly and are engageable with the bump shoulders.

3. In a wheel structure including a tire rim and a supporting disk spider wheel body having an annular intermediate axially outwardly projecting nose bulge provided at circumferentially spaced intervals with generally radially outwardly projecting retaining bump protrusions with radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and resiliently flexible retaining fingers concealingly carried by said spoke arms and engageable under resiliently flexible tension retainingly with said bump shoulders and thereby retaining the hub cap member in place on the wheel and drawn axially inwardly tightly against the wheel, said retaining fingers comprising underturned finger flanges from side walls defining said spoke arms and each of the finger flanges having a generally circumferentially projecting terminal end from which radially inner and radially outer sides of the fingers taper toward juncture with the associated arm sidewall and with portions of the radially inner sides of the fingers providing retaining edges engageable with the bump shoulders, said radially inner bump shoulder engaging edges of the fingers being turned generally radially inwardly and axially outwardly to oppose the bump shoulders generally normally edgewise to enhance gripping engagement with the shoulders.

4. In a wheel structure including a tire rim and a supporting disk spider wheel body having an annular intermediate axially outwardly projecting nose bulge provided at circumferentially spaced intervals with generally radially outwardly projecting retaining bump protrusions with radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and resiliently flexible retaining fingers concealingly carried by said spoke arms and engageable under resiliently flexible tension retainingly with said bump shoulders and thereby retaining the hub cap member in place on the wheel and drawn axially inwardly tightly against the wheel, each of said spoke arms having a pair of the retaining fingers with terminal ends of the fingers directed generally circumferentially toward but in spaced relation to one another and the fingers being of increasing stiffness from their tips to juncture with the respective spoke arms.

5. In a wheel structure including a wheel body and a tire rim, the wheel body having generally radially outwardly projecting cover retaining bumps with radially outwardly and axially inwardly facing retaining shoulders, a hub cap cover member of generally axially inwardly opening arched shell form for centrally overlying the wheel body and having radially outwardly projecting integral shell arms of a length to overlie the tire rim and provided with sidewalls joining intervening segmental portions of the cap, said spoke arms and said cap segmental portions being of substantially rigid mutually reinforcing structure, said arm side walls having retaining finger flange extensions radially outwardly adjacent to juncture of the sidewalls with the intervening segments and such finger extensions being turned under and toward one another and providing generally radially inwardly and axially outwardly facing bump shoulder engaging edges retainingly engageable with the bump shoulders under resilient tension of the retaining finger flanges.

6. In a wheel structure including a wheel body and a tire rim, the wheel body having generally radially outwardly projecting cover retaining bumps with radially outwardly and axially inwardly facing retaining shoulders, a hub cap cover member of generally axially inwardly opening arched shell form for centrally overlying the wheel body and having radially outwardly projecting integral shell arms of a length to overlie the tire rim and provided with sidewalls joining intervening segmental portions of the cap, said spoke arms and said cap segmental portions being of substantially rigid mutually reinforcing structure, said arm side walls having retaining finger flange extensions radially outwardly adjacent to juncture of the sidewalls with the intervening segments and such finger extensions being turned under and toward one another and providing generally radially inwardly and axially outwardly facing bump shoulder engaging edges retainingly engageable with the bump shoulders under resilient tension of the retaining finger flanges, said cap segments having edges drawn against the wheel body by the retaining tensioned engagement of said finger flange edges with the bumps and the spoke arms radially outwardly beyond the finger flanges being disposed in spaced relation to the tire rim.

7. In a hub cap and spoke arm shell unit, an essentially domed hub cap shell provided with a plurality of circumferentially spaced and radially outwardly projecting integral spoke arms in one piece therewith extending from its periphery, the unit being a unitary hollow shell of axially inwardly opening form with angular crown panels on the spoke arms joining at the center of the unit in reinforcing angular relation and with angular sidewalls of the spoke arms projecting radially outwardly beyond the intervening portions of the domed cap and having connecting angular flange portions disposed in reinforcing relation to the arm crown panels and to the intervening dome portions of the cap.

8. In a wheel structure including a part having generally radially projecting rigid cover retaining protrusions, said protrusions having generally circumferentially facing sides and respective generally axially inwardly and radially facing retaining shoulders, a cover member having generally radially projecting spoke arms provided therebehind with cover retaining flanges having retaining edges facing radially oppositely to said protrusion shoulders and engageable in cover retaining relation with said protrusion shoulders, camming-in means along one circumferential side of the retaining flanges cammingly engageable with one of said circumferentially facing sides of the protrusions for camming the retaining flanges into engagement with the retaining shoulders by relative turning of the cover member and the wheel, and stop means on the opposite circumferential sides of the retaining flanges from the camming-in means and engageable, after the retaining flanges have engaged the retaining shoulders with said one of said circumferential sides of the retaining protrusions to prevent overrunning of the retaining flanges relative to the protrusions during turning of the cover member into position on the wheel.

9. In a wheel structure including a tire rim and a supporting disk spider wheel body having an annular intermediate axially outwardly projecting nose bulge provided at circumferentially spaced intervals with generally radially outwardly projecting retaining bump protrusions with radially outwardly and axially inwardly facing retaining shoulders, a substantially rigid hub cap of a diameter to overlie the central portion of the wheel body and at least a portion of said nose bulge and having radially outwardly projecting spoke arms of a number and spacing matching the number and spacing of the retaining bumps, and resiliently flexible finger flanges concealingly carried by said spoke arms and engageable under resiliently flexible tension retainingly with said bump shoulders and thereby retaining the hub cap member in place on the wheel and drawn axially inwardly tightly against the wheel, said finger flanges having on one circumferential side of the spoke arms camming-in inturned shoulders to implement turning attachment of the hub cap and engagement of the finger flanges with the bump shoulders.

10. In a wheel structure including a part having a circumferentially spaced plurality of generally radially projecting protrusions providing axially inwardly and radially facing rigid cover retaining shoulders, a spoke arm domed hollow shell hub cap cover member comprising a one-piece sheet metal structure having a central axially inwardly opening hollow dome portion with a circumferentially spaced and radially outwardly projecting plurality of hollow shell arms arranged to overlie said protrusions, said arms having sidewalls facing generally toward one another in spaced relation and provided with retaining finger flange portions spaced radially outwardly from said dome portion and concealed behind said arms, said finger flange portions being resiliently flexible and having retaining edges thereon facing radially oppositely to and toward said protrusions and being engageable under resilient tension of said fingers retainingly with said protrusion shoulders.

11. In a wheel structure including a part having generally radially projecting rigid cover retaining protrusions, said protrusions having generally circumferentially facing sides and respective generally axially inwardly and radially facing retaining shoulders, a cover member having generally radially projecting spoke arms which include opposed spaced side walls provided with cover retaining flanges joined to said side walls and projecting into concealed relation behind the respective arms, having retaining edges facing generally radially oppositely to said protrusion shoulders and engageable in cover retaining relation with said protrusion shoulders, and certain of said retaining flanges having adjacent to juncture thereof with the side walls turned portions affording camming shoulders which are cammingly engageable with one of said circumferentially facing sides of the protrusions for camming the retaining flanges into engagement with the retaining shoulders by relative turning of the cover member and the wheel.

12. In a wheel structure including a wheel body and a tire rim supported thereby and having a terminal flange including a generally radially inwardly facing portion, the wheel body having an annular nose bulge with generally radially outwardly projecting cover retaining bumps having wheel body-overhanging radially outwardly and axially inwardly facing respective shoulders, a hub cap member engageable edgewise against the nose bulge and having a plurality of circumferentially spaced arms projecting radially outwardly therefrom and into spaced relation axially outwardly opposite the tire rim and with tips thereof in adjacent spaced relation to said radially inwardly facing portion of the terminal flange, said arms having therebehind and radially outwardly from the cap retaining structure engageable with the shoulders of the retaining bumps by turning of the cover from an out of phase relationship of the arms to the bumps into a registration of the arms over the bumps, said bearing engagement of the cap with the nose bulge defining the axially inward disposition of the cover during the turning and the opposition of the tips of the arms to said radially facing portion of the terminal flange defining a substantially centered relation of the cap during initial assembly of the hub cap with the wheel to facilitate turning interengageemnt of the cover retaining means with the retaining bumps.

References Cited in the file of this patent

UNITED STATES PATENTS

| | | |
|---|---|---|
| Re. 18,692 | Clark | Dec. 20, 1932 |
| 1,510,048 | Evans | Sept. 30, 1924 |
| 1,944,658 | Griffith | Jan. 23, 1934 |
| 2,115,182 | Sinclair | Apr. 26, 1938 |
| 2,217,086 | Whitacre | Oct. 8, 1940 |
| 2,276,405 | Lyon | Mar. 17, 1942 |
| 2,597,010 | Lyon | May 20, 1952 |
| 2,625,439 | Horn | Jan. 13, 1953 |
| 2,675,271 | Lyon | Apr. 13, 1954 |
| 2,707,449 | Lyon | May 3, 1955 |